US009820288B2

(12) United States Patent
Höyhtyä et al.

(10) Patent No.: US 9,820,288 B2
(45) Date of Patent: Nov. 14, 2017

(54) METHOD AND SYSTEM FOR UTILIZING SPECTRUM DATA IN A COGNITIVE WIRELESS ACCESS SYSTEM

(71) Applicant: Teknologian tutkimuskeskus VTT Oy, Espoo (FI)

(72) Inventors: Marko Höyhtyä, Oulu (FI); Janne Kuismin, Oulu (FI); Heli Vuojala, Oulu (FI)

(73) Assignee: Teknologian Tutkimuskeskus VTT OY, Espoo (FI)

( * ) Notice: Subject to any disclaimer, the term of this patent is extended or adjusted under 35 U.S.C. 154(b) by 0 days.

(21) Appl. No.: 14/892,225

(22) PCT Filed: May 16, 2014

(86) PCT No.: PCT/FI2014/050373
§ 371 (c)(1),
(2) Date: Nov. 19, 2015

(87) PCT Pub. No.: WO2014/188064
PCT Pub. Date: Nov. 27, 2014

(65) Prior Publication Data
US 2016/0095129 A1 Mar. 31, 2016

(30) Foreign Application Priority Data
May 20, 2013 (FI) ...................................... 20135533

(51) Int. Cl.
| *H04Q 7/00* | (2006.01) |
| *H04W 72/08* | (2009.01) |
| *H04W 16/14* | (2009.01) |
| *H04W 72/04* | (2009.01) |
| *H04W 28/08* | (2009.01) |

(52) U.S. Cl.
CPC ......... *H04W 72/082* (2013.01); *H04W 16/14* (2013.01); *H04W 28/08* (2013.01);
(Continued)

(58) Field of Classification Search
CPC .......... H04W 72/082; H04W 72/0413; H04W 72/0446; H04W 28/08; H04W 16/14; H04W 72/0453; H04W 72/08
(Continued)

(56) References Cited

U.S. PATENT DOCUMENTS

| 7,958,041 B2 | 6/2011 | Stanforth et al. |
| 8,514,699 B2 * | 8/2013 | Kim ...................... H04W 28/16 370/230 |

(Continued)

FOREIGN PATENT DOCUMENTS

| CN | 101841818 B | 12/2012 |
| GB | 2477649 A | 8/2011 |

(Continued)

OTHER PUBLICATIONS

U.S. Appl. No. 61/797,045, filed Nov. 28, 2012.*
(Continued)

*Primary Examiner* — Chuong T Ho
(74) *Attorney, Agent, or Firm* — Berggren, Inc.

(57) ABSTRACT

The invention relates to a cognitive wireless communication system where a wireless terminal is allowed to utilize in channel selection process both licenced bands and unlicensed bands that are available. The invention relates also to a method and computer program for allocating a transmission channel for a wireless terminal either from licenced or unlicensed bands in a cognitive radio system by a resource management server. The utilized spectrum data is gathered by spectrum sensing from databases and control channels and it is saved in a database. A transmission channel to a wireless terminal is allocated by the resource management server by utilizing gathered short term and long term spectrum data.

13 Claims, 4 Drawing Sheets

(52) U.S. Cl.
CPC ... *H04W 72/0413* (2013.01); *H04W 72/0446* (2013.01); *H04W 72/0453* (2013.01); *H04W 72/08* (2013.01)

(58) Field of Classification Search
USPC .................................. 370/329, 330, 230, 235
See application file for complete search history.

(56) References Cited

U.S. PATENT DOCUMENTS

| | | | |
|---|---|---|---|
| 9,491,527 B2* | 11/2016 | Sanita | H04J 14/0227 |
| 2007/0156709 A1* | 7/2007 | Hageman | H04W 88/08 |
| 2007/0208835 A1* | 9/2007 | Te Marvelde | G06F 9/4843 709/223 |
| 2007/0276980 A1* | 11/2007 | Hageman | G06F 13/40 710/307 |
| 2009/0154413 A1* | 6/2009 | Kim | H04W 28/16 370/329 |
| 2011/0228832 A1 | 9/2011 | De Francisco Martin | |
| 2012/0094681 A1 | 4/2012 | Freda et al. | |
| 2012/0134328 A1 | 5/2012 | Gauvreau et al. | |
| 2014/0080483 A1 | 3/2014 | Elsherif et al. | |
| 2014/0162585 A1* | 6/2014 | Bose | H04W 16/14 455/404.1 |

FOREIGN PATENT DOCUMENTS

| | | |
|---|---|---|
| WO | 2008/109641 A2 | 9/2008 |
| WO | 2011/154612 A1 | 12/2011 |
| WO | 2012078320 A1 | 6/2012 |

OTHER PUBLICATIONS

Yucek T. et al. "A survey of spectrum sensing algorithms for cognitive radio applications" IEEE Communications Surveys, Jan. 1, 2009 IEEE, New York, NY, US, vol. 11, Nr: 1, pp. 116-130, Chapter III.D.

Anindita Kundu et al "QoS Aware Integrated Call Admission and Cognitive Channel Allocation Scheme for a Macro-Femto BWA Network", AICIT Journal of Research Notes in Information Science, vol. 11, Jan. 2013, pp. 47-59, XP055157786, DOI: 10.4156/mis.vol. 11.5.

Höyhtyä Marko et al. "Cognitive radio: An intelligent wireless communication system", Research Report No. VTT-R-02219-08, Mar. 14, 2008, pp. 1-154, XP055156743, Oulu, Finland. Retrieved from the Internet: URL: http://www.vtt.fi/inf/julkaisut/muut/2008/CHESS_Research_Report.pdf [retrieved on Dec. 4, 2014].

McHenry, M. et al. "Multi-band multi-location spectrum occupancy measurements" in Proc. ISART, Mar. 2006.

Lehtomäki, J. et al. "Energy dectection based estimation of channel occupancy rate with adaptive noise estimation", IEICE Transactions on Communications, vol. E95-B, pp. 1076-1084, Apr. 2012.

Denkovski, D. et al. "Parameter settings for 2.4 GHz ISM spectrum measurements" in Proc. ISABEL, Nov. 2010.

Li, X. et al. "Traffic pattern prediction and performance investigation for cognitive radio systems" in Proc. WCNC, pp. 894-899, Mar.-Apr. 2008.

Finnish Patent and Registration Office Search Report dated Mar. 3, 2014 for FI20135533.

* cited by examiner

METHOD AND SYSTEM FOR UTILIZING SPECTRUM DATA IN A COGNITIVE WIRELESS ACCESS SYSTEM

This application is a national application of PCT-application PCT/FI2014/050373 filed on May 16, 2014, which claims priority of the Finnish national application number FI20135533 filed on May 20, 2013, both of which are incorporated herein by reference.

TECHNICAL FIELD

The invention relates to a cognitive wireless communication system where a wireless terminal is allowed to utilize both licenced bands and unlicensed bands that are available. A transmission channel to a wireless terminal is allocated by utilizing gathered spectrum data. The invention also relates to a method for gathering spectrum data of licenced and unlicensed bands in a cognitive radio system. The spectrum data is gathered by spectrum sensing from databases and control channels of available wireless networks.

BACKGROUND

A conventional spectrum allocation policy suffers from a shortage of spectrum. The shortage limits ability to introduce new wireless products, services, and applications such as pervasive broadband Internet access. The spectrum shortage limits also ability to make current systems (for example cellular telephony) more common and less expensive, to increase the data rates and ranges of existing products like WiFi, and the shortage limits even the ability to provide public safety authorities with the communications systems they need to do their jobs. The radio frequency spectrum bands are mostly allocated to existing licensed users. Thus, there does not seem to be much room for new wireless services. However, spectrum measurements conducted around the world reveal that many bands are used only part of the time and/or locally. With a proper spectrum sharing mechanisms and policies more efficient spectrum use could be achieved since the system needing more bandwidth could access also other bands than its own licensed band to achieve higher capacity.

Spectrum data gathering and analysis have been published in many opportunistic spectrum use documents in recent years. In them several parameters have been proposed to be gathered about the radio environment [M. McHenry, D. McCloskey, G. Minden, and D. Roberson, "Multi-band multi-location spectrum occupancy measurements" in Proc. ISART, March 2006] and [J. Lehtomäki, R. Vuohtoniemi, K. Umebayashi, and J. P. Mäkelä, "Energy detection based estimation of channel occupancy rate with adaptive noise estimation", IEICE Transactions on Communications, vol. E95-B, No. 4, pp. 1076-1084, April 2012].

However, most of the publications do not concentrate deeply on parameter selection. In some publications adaptive parameter settings have been investigated regarding the threshold, resolution bandwidth and sweep time to increase the accuracy in the occupancy measurements in ISM bands [D. Denkovski, M. Pavloski, V. Atanasovski, and L. Gavrilovska, "Parameter settings for 2.4 GHz ISM spectrum measurements" in Proc. ISABEL, November 2010].

Spectrum sharing models using both short term and long term information in spectrum sharing have been proposed. Traffic prediction may be performed for different traffic models, e.g. assuming exponentially distributed idle periods or using binomial distributed call arrival and gamma distributed call holding times. In publication of X. Li and S. A. Zekavat, "Traffic pattern prediction and performance investigation for cognitive radio systems" in Proc. WCNC, pp. 894-899, March-April 2008, it is described a 24-hour period prediction case for cognitive radio systems.

There are still problems to be solved. One problem is how reliable spectrum awareness information could be obtained for deciding which channels could be used for augmenting the current system bandwidth.

A second problem is what kind of information is needed about the candidate frequency channels to be able to decide whether they are good candidates for a transmission channel of the application in mind.

A third problem is what kind of decision-making is needed for channel selection when multiple parameters such as bandwidth and delay requirements of the application/service, spectrum occupancy and idle time statistics from different frequency bands are required.

Commercial significance of the above-mentioned problems lay in the fact that spectrum is an expensive and limited resource. Thus, an efficient spectrum analysing and sharing approach enabling high spectrum occupancy would be very valuable for the network operators. Also end users would like the method allowing more and better services to be served with the same price.

SUMMARY OF THE INVENTION

An aspect of the present invention is to provide a method for selecting most promising spectrum bands for an end-user application of a wireless system.

A second aspect of the present invention is to provide a method for allocating suitable licensed or unlicensed bands to requested services. The allocation is based on the end-user application requirements and the data analyzed in frequency and time domain at the location of request.

A third aspect of the present invention is to provide a system for measuring wireless communication landscape and based on the measurement results to allocate suitable licensed or unlicensed bands for different wireless communications systems.

The aspects of the invention are achieved by a method and resource allocating system where multiple parameters are utilized in the analysis of the spectrum use in the area of interest. The allocating method takes into account the capacity of licensed and unlicensed bands. Spectrum data for the channel selection is gathered utilizing spectrum sensing, databases and control channels. The gathered data is analyzed to find most promising spectrum bands for a wireless system. The decision of the band to be allocated to the wireless system is based on the end-user application requirements. Spectrum occupancy, bandwidth of the revealed spectrum opportunities and their idle time characteristics are used in the channel selection process. The results of the analysis of the gathered spectrum data are stored as long term information to assist a dynamic spectrum management method in the given geographical area.

An advantage of the invention is that it guarantees good service for the users already using the radio resources.

Furthermore, the invention has the advantage that a combination of the analysis method and allocating method makes the channel selection faster compared to the channel selection methods known in the prior art.

Furthermore, the invention has the advantage that it provides long term and short term information about the radio landscape that is utilized in determining if the bandwidth requirements of the requesting service could be fulfilled. Since the analysis is made already before the access request, the allocating information can be offered very rapidly to the apparatus that has requested a communications connection.

Furthermore, the invention has the advantage that it takes into account the requirements of end-user applications and services requesting access to the band from the first beginning.

Furthermore, the invention has the advantage that existing users can continue operation in the channels while a new service is allocated to an available channel supporting QoS requirements.

Furthermore, the invention has the advantage that also offload channels for existing services may be utilized.

Furthermore, the invention has the advantage that short term database allows classification and prediction in the bands of interest. This leads to intelligent channel selection for data and control transmission and thus improves the system performance both by increasing the throughput of the secondary system and also reducing interference caused towards primary users.

Furthermore, the invention has the advantage that it classifies the traffic in different channels to deterministic and stochastic and uses specific prediction methods for different types of traffic to estimate what the following idle times in different channels will be.

The method according to the invention for allocating a transmission channel for a wireless data processing device by a resource management server in which method the resource management server:
  checks bandwidth of the received service request;
  determines if at least one transmission channel of the available unlicensed bands has enough bandwidth for the requested service;
  checks occupancy status of the transmission channels having required bandwidth; and
  determines if at least one transmission channel with the required bandwidth and the allowable occupancy status is found,
is characterized in that the resource management server further:
  checks idle time statistics of all transmission channels having the required bandwidth and the allowable occupancy status;
  determines if at least one transmission channel with the required bandwidth, the allowable occupancy status and the allowable idle time status is found, and;
  allocates the found transmission channel to the requested service.

The transmission channel allocating system according to the invention comprises a resource management server that is configured to allocate a transmission channel to a requested service, the resource management server comprising:
  means for determining bandwidths of all available transmission channels and if at least one transmission channel with a required bandwidth is found;
  means for checking occupancy status of the transmission channels being available and having required bandwidth; and
  means for determining if at least one transmission channel with the required bandwidth and the allowable occupancy status is found,
characterized in that the resource management server further comprises:
  means for checking idle time statistics of all transmission channels having the required bandwidth and the allowable occupancy statistics;
  means for determining if at least one transmission channel with the required bandwidth, the allowable occupancy statistics and the allowable idle time status is found, and;
  means for allocating the found transmission channel to the requested delay sensitive service.

The computer program according to the invention for allocating transmission channels in a dynamic spectrum management comprises:
  computer readable code for checking bandwidth requirements of the received service request;
  computer readable code for determining if at least one transmission channel of the available unlicensed bands has enough bandwidth for a requested delay sensitive service;
  computer readable code for checking occupancy status of the transmission channels having the required bandwidth; and
  computer readable code for determining if at least one transmission channel with the required bandwidth and the allowable occupancy status is found,
characterized in that it further comprises:
  computer readable code for checking idle time statistics of all transmission channels having the required bandwidth and the allowable occupancy status;
  computer readable code for determining if at least one transmission channel with the required bandwidth, the allowable occupancy status and the allowable idle time status is found, and;
  computer readable code for allocating the found transmission channel to the requested service.

Some advantageous embodiments of the invention are presented in the dependent claims.

The basic idea of the invention is the following: The allocating method according to the invention guarantees good service both for a new user and the users already using the radio resources. In the method multiple parameters are utilized in the analysis of the spectrum use in a particular geographical area of interest. When a new service request has been received by a service management server, it checks quality of service (QoS) requirements of the service request. QoS requirements may disclose advantageously bandwidth and also delay requirements. In the allocation method according to the invention the resource management server utilizes also spectrum data that can be retrieved from a database wherein sensed spectrum data of licensed and unlicensed bands have been saved in advance. The spectrum data includes for example channel occupation data and short and long term idle time statistics.

In the allocation method according to the invention the sensed spectrum data is analysed and saved in a database. The results of the spectrum analysis are stored as long term information to assist dynamic spectrum management method according to the invention in a particular geographical area. The resource management server utilizes the analysis results to find most promising spectrum bands for the wireless system based on the end-user application requirements. Spectrum occupancy, bandwidth of the revealed spectrum opportunities and their idle time characteristics are used in the analysis. Both long term (LT) information on the use of primary channels and short term (ST) data are used in defining which channels are best for data transmission.

If the resource management server finds out that a licensed band cannot be allocated to the requested service, it checks if at least one unlicensed band has the required bandwidth, low occupancy status and usable idle time statistics. If a usable transmission channel has been found, this is allocated to the new service request. In a case where also none of the unlicensed bands can be allocated to the requested service one or more existing services may be offloaded for making room to the new service request.

The channel allocation method according to the invention enables efficient and fair spectrum sharing, increases throughput and decreases collisions with primary users.

A requirement for the wireless device using the saved long term information is that it should be able to tell the bandwidth requirement and other parameters to the decision-making entity that manages the spectrum use.

The invention brings new aspects to spectrum sharing by combining several application related parameters into analysis, generalizing the analysis to any frequency band, to any wireless system and to any end-user application in mind. The method according to the invention can be used in assisting the spectrum sharing for licensed systems to operate in spectrum bands that are not reserved for it. In addition, the proposed method can be easily applied to the unlicensed systems accessing opportunistically bands that are not licensed for them.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE DRAWINGS

In the following description, considered embodiments are merely exemplary, and one skilled in the art may find other ways to implement the invention. Although the specification may refer to "an", "one" or "some" embodiment(s) in several locations, this does not necessarily mean that each such reference is made to the same embodiment(s), or that the feature only applies to a single embodiment or all embodiments. Single feature of different embodiments may also be combined to provide other embodiments.

The spectrum sharing method and system according to the invention uses spectrum sensing, databases and control channels to gather spectrum data over the frequencies of interest for example from 700 MHz to 3 GHz.

First is described a spectrum sensing method that is advantageously utilized in the channel selection and allocation method according to the invention. Spectrum sensing is advantageously performed with high resolution, for example with 100 kHz frequency bins, to be able to obtain a detailed view on the spectrum in the location of interest. In addition, sensing is also performed frequently enough to be able to see short-term variations in spectrum use.

The gathered spectrum data is analysed to reveal both the bandwidth of spectrum holes (with the accuracy of the resolution of the sensors) at each time instant as well as idle time statistics. Obtained data is then used to calculate spectrum occupancy with different bandwidths over the spectrum of interest. Sliding time window (for example over an hour) is advantageously used in calculations and the corresponding occupancy results are stored as long term statistics of the channels.

Figure 1A:
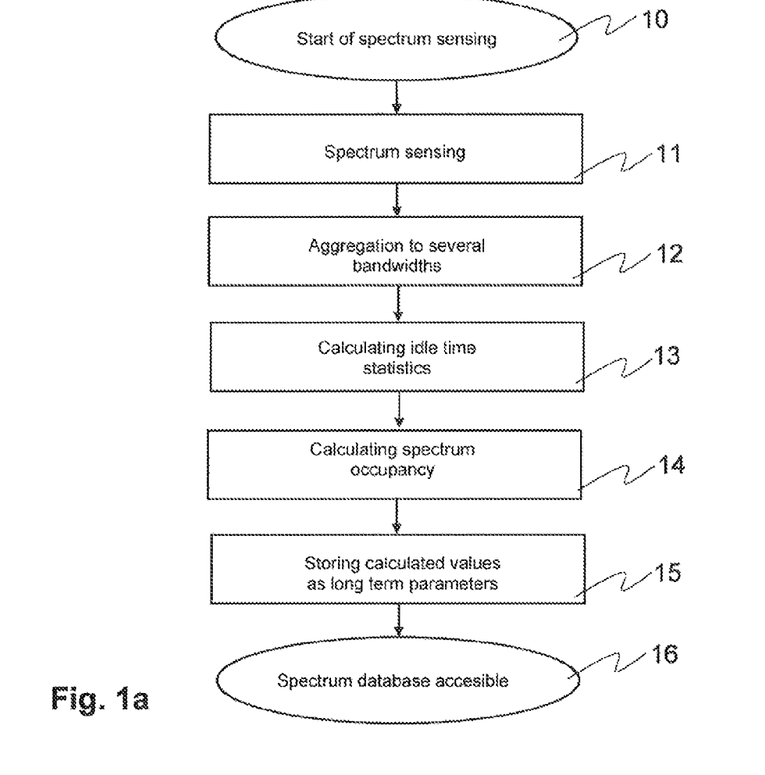
FIG. 1a shows an exemplary flow chart including main stages of the spectrum sensing method utilized in the invention.

FIG. 1a depicts as an exemplary flow chart main steps of the spectrum sensing method. In step 10 the spectrum sensing is started.

In step 11 of the flow chart the spectrum is sensed periodically with spectrum sensors of a proper measurement apparatus using rather narrow frequency bins. The binary results of the sensing are advantageously stored at least temporally in the memory of the measurement apparatus. In a second step the measurement results may also be stored in a memory unit of a resource management server for further processing. The measurement result for a bin may be '1' which means that the frequency bin was occupied. If the result is '0', it means that the frequency bin was idle at the time of sensing. As an example, a band of 10 MHz can be divided into 100 frequency bins each having a 100 kHz bandwidth. Spectrum sensing over the whole band provides binary results for each of the 100 bins at every time instant. If the sensing over the band is performed once in a second, the results are provided using the same timescale. When the total measurement time is 1 hour, i.e. 3600 seconds, the produced data includes 3600 binary samples for each 100 hundred channels (a matrix having 100 rows and 3600 columns).

In step 12 measurement results of the sensed bins are aggregated to several bandwidths in a proper information processing apparatus, for example the resource management server. Stored sensing results from the frequency bins are combined to analyse the frequency use with different bandwidths. The aggregation can be done to any bandwidth from the single frequency bin up to total sensing bandwidth. The aim behind this is to find suitable opportunities for different services and applications that may have different bandwidth requirements. For example a wireless video transmission requires more bandwidth than a voice transmission. The aggregation in step 12 is advantageously done to several different bandwidths and the results are stored for further use. Then, the device requesting for example 5 MHz bandwidth can obtain very useful information about the operation possibilities since the analysis done with the same bandwidth will provide informative data for the device.

In an example analysis case that is done in the ISM band (Industrial, Scientific and Medical) using three different bandwidths (20 MHz, 10 MHz and 5 MHz) shows that the results are heavily dependent on the analysis bandwidth. For example a 10 MHz analysis bandwidth gives a 25% occupancy over a 24-hour period in one location whereas the analysis with 5 MHz bandwidth shows a 19% occupancy.

In step 13 idle time statistics are calculated in the resource management server. The idle time statistics for the several bandwidths are calculated over a long time period to determine the lengths of idle and busy times and their distribution. Mean idle time and busy times for each analysed bandwidth are advantageously calculated. This step adds time domain information to the analysed channels. The added information may be utilized for finding channels providing long enough idle times for a requested operation and for reducing the amount of channel switching since more data can be transmitted during a long idle time period.

In step 14 spectrum occupancy is calculated in the resource management server. Spectrum occupancy, i.e. the percentage of time when a particular channel is in use, is determined for each analysis bandwidths over a time period of interest. Very high spectrum occupancy values mean that the channel is not suitable for secondary operation nor is there room for spectrum sharing in general. However, occupancy alone without idle time statistics is not an adequate metric in characterizing channels. As an example, a channel having a 100 ms idle followed by a 50 ms busy time periodically has only a 33% occupancy but the possibility to opportunistically use very short idle times is very limited. Another channel might have 10 seconds long idle times and busy times, leading to 50% occupancy. Still, the latter channel is a much better choice for the opportunistic radio system when the channel is idle.

In step 15 measurement results are stored as long term parameters in a database whereto the resource management server has access. The analysed parameters are stored in the database for each analysis bandwidth to be used in the dynamic spectrum management. In addition to the above-described sensing based information also information coming from the control channels or databases may be stored in this database. The stored data corresponds to the bandwidth of the device/service aiming for opportunistic access in this particular band. Since different devices/services are using different bandwidths, the database should include information with several bandwidths as well to be rapidly usable.

Figure 1B:
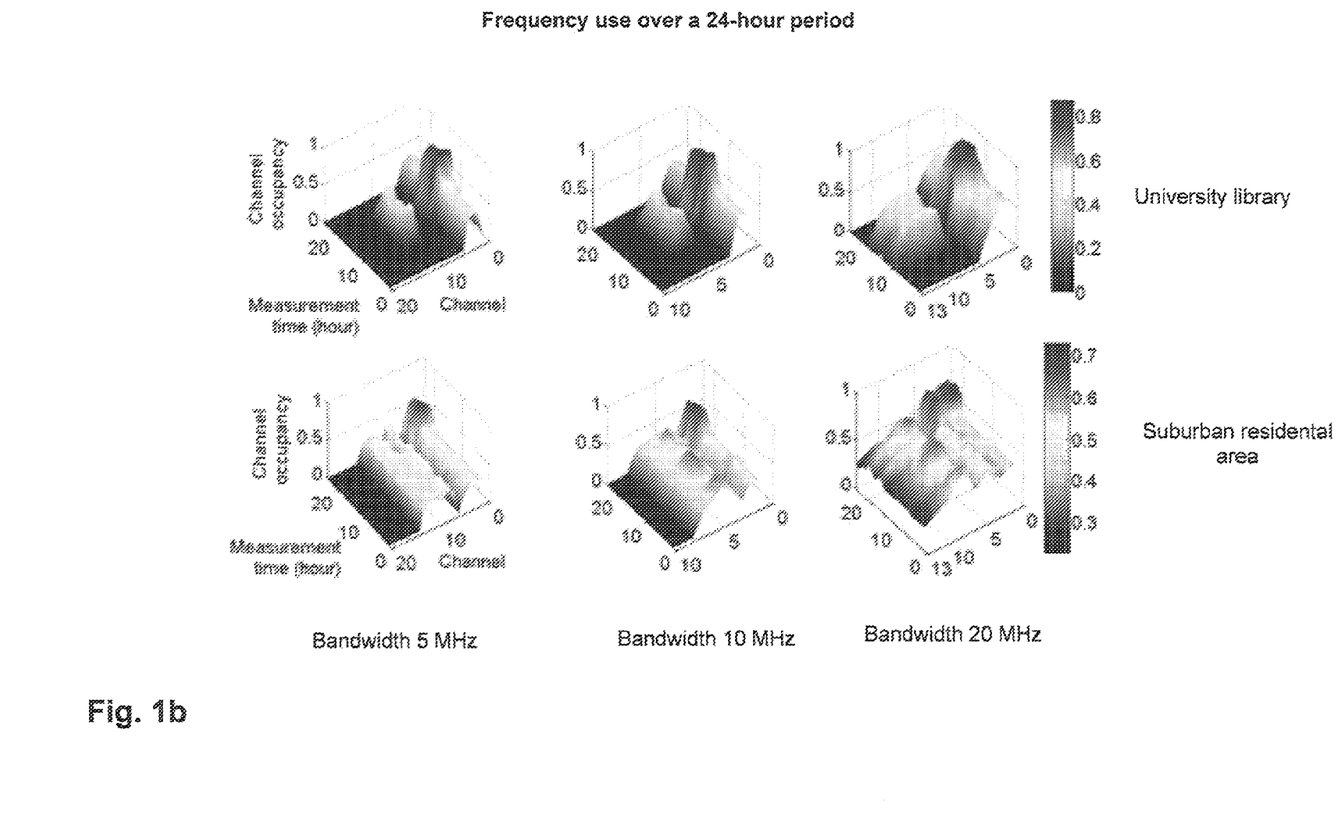
FIG. 1b shows measurement results of an exemplary spectrum sensing case.

FIG. 1b: An Example of Sensing Spectrum Occupancy:

In this exemplary case the measurement apparatus is Fluke Networks PC Card Sensor attached to a laptop computer. The measurement apparatus is capable of monitoring 2.4 GHz and 5 GHz bands where the wireless local area networks (WLAN) are operating. The device measures the spectrum use over 641 frequency bins in the 2.4 GHz ISM band, each having a 156 kHz bandwidth. The duty cycle for each bin is obtained by the device.

A suburban residential area and a library in the premises of a university campus were chosen as comparative measurement locations. The spectrum use in these areas was expected to differ significantly from each other for example regarding the busy hours. The measurements were conducted over a 24-hour period to investigate the spectrum occupancy at different times of day.

FIG. 1b shows the spectrum occupancy values for both studied locations with all analysis bandwidths (5 MHz, 10 MHz, and 20 MHz) over the 24-hour measurement period. The measurement is conducted on a normal working day from midnight until the following midnight. The first row shows the situation in the university library and the second row the occupancy in the suburban residential area. Significant differences between the locations can be seen both in the overall occupancy as well as in the busy hours. Clearly the office hours are most highly occupied in the university library. The highest occupancy values are found between 10 a.m. and 5 p.m. In the suburban residential area evening hours have the highest occupancy values, the busiest time being between 8 p.m. and 11 p.m.

The university library is used by the students and university employees during working hours whereas in the suburban residential area the use is the highest during free time.

It can be seen from FIG. 1b that the smaller the analysis bandwidth is, the more there seems to be room for opportunistic operation. Moreover, the upper part of the spectrum seems to have no use at all when we look at the analysis bandwidths of 5 MHZ and 10 MHz. The result shows that the spectrum of 2483.5-2500 MHz reserved for satellite use is not used at all in the investigated locations.

Numerical information for all the analysis bandwidths and locations are shown in Table I.

TABLE I

Occupancy and idle time values for all the bandwidths in both studied locations

| Location, analysis bandwidth | Average spectrum occupancy (%) | Busy hour occupancy (%) | Average idle time of a single channel, whole period/busy hour(s) |
|---|---|---|---|
| University | | | |
| 20 MHz | 24.75 | 45.98 | 2.27/1.47 |
| 10 MHz | 14.73 | 24.77 | 28.88/6.15 |
| 5 MHz | 11.93 | 20.93 | 2.29/1.58 |
| Suburban | | | |
| 20 MHz | 45.37 | 49.98 | 2.65/3.09 |
| 10 MHz | 24.74 | 29.36 | 3.63/3.44 |
| 5 MHz | 18.62 | 22.74 | 4.07/6.86 |

The average spectrum occupancy defines the overall occupancy over the whole analysis bandwidth. The occupancy of over 20 MHz WLAN channels using the analysis method is rather high compared to the reported ISM occupancy values in the literature. However, reduction of the bandwidth has a strong impact on occupancy values. If the starting point is WLAN channel of 20 MHz, then in the suburban area can be found a 45% reduction of the spectrum occupancy when compared to a 10 MHz and 59% reduction when compared to 5 MHz. In the university library can be found a 40% reduction of the spectrum occupancy when compared to a 10 MHz and 52% reduction of the spectrum occupancy when compared to 5 MHz.

Busy hour occupancy shown in Table I refers to mostly occupied single hour over the whole measurement period. In the suburban area the spectrum use is very flat without peaks during busy hours. In the university library the difference is much higher due to high use during office hours compared to other times.

Figure 2:
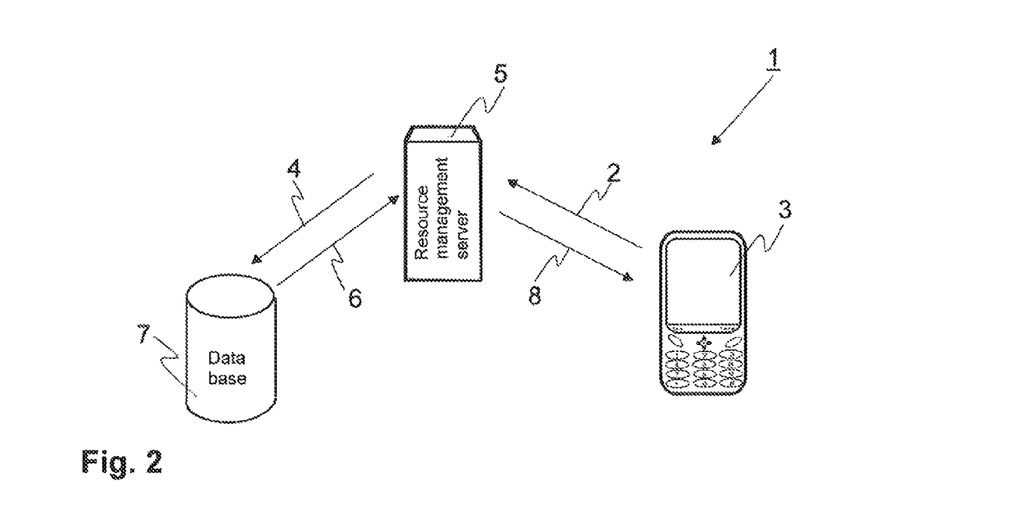
FIG. 2 shows an example of a spectrum sharing system.

FIG. 2 depicts an example of a spectrum management system 1 according to the invention where spectrum data created according to the measurement process of FIG. 1 is utilized. A mobile device 3 requests a channel or link for a certain application and embeds the quality of service (QoS) requirements such as bandwidth and delay in the access request message 2 that it has sent to the resource management server 5. When possible, the requested service can be allocated in the operator owned frequency band. If there is no room in the operator owned frequency band, the spectrum management system 1 starts a dynamic spectrum sharing process.

First, required QoS requirements, for example long term spectrum occupancy values, are checked from the database 7 wherein short term and long term variations in spectrum usage of the required bandwidth are saved. Only channels with an occupancy value below a specified threshold are accepted for further decision process in the resource management server 5. Then, idle time statistics over the recent short term period are checked for channel candidates (references 4 and 6).

Channel(s) supporting the QoS requirements also in time domain are selected for transmission. Delay requirements of applications are taken into account as follows. Delay-tolerant applications and services can use shorter idle times and switch between candidate channels. But delay-sensitive applications should focus on licensed channels and channels with long idle times.

Thus the resource management server 5 according to the invention uses both long term and short term information in decision-making. Long term database includes information which is collected for example over a day or a week. Short term information covers in detail the channel use for example over a few seconds or minutes. The resource management server 5 allocates 8 a suitable channel to the mobile device 3.

The resource management server 5 comprises one or more processor units. The processor or processor means can comprise an arithmetic logic unit, a group of different registers and control circuits. It comprises also a data storing arrangement, such as a memory unit or memory means, wherein computer-readable information, measurement programs and channel measurement information can be stored, has been connected to the processor means. The memory means typically contain memory units, which allow both reading and writing functions (Random Access Memory, RAM), and memory units containing non-volatile memory, from which data can only be read (Read Only Memory, ROM).

The resource management server 5 comprises also interface elements, which comprise an input/output or input/output means for receiving or sending information from or to mobile devices 3 and the database 7. The information received with the input means is transferred to be processed by the processor means of the resource management server 5.

Figure 3A:
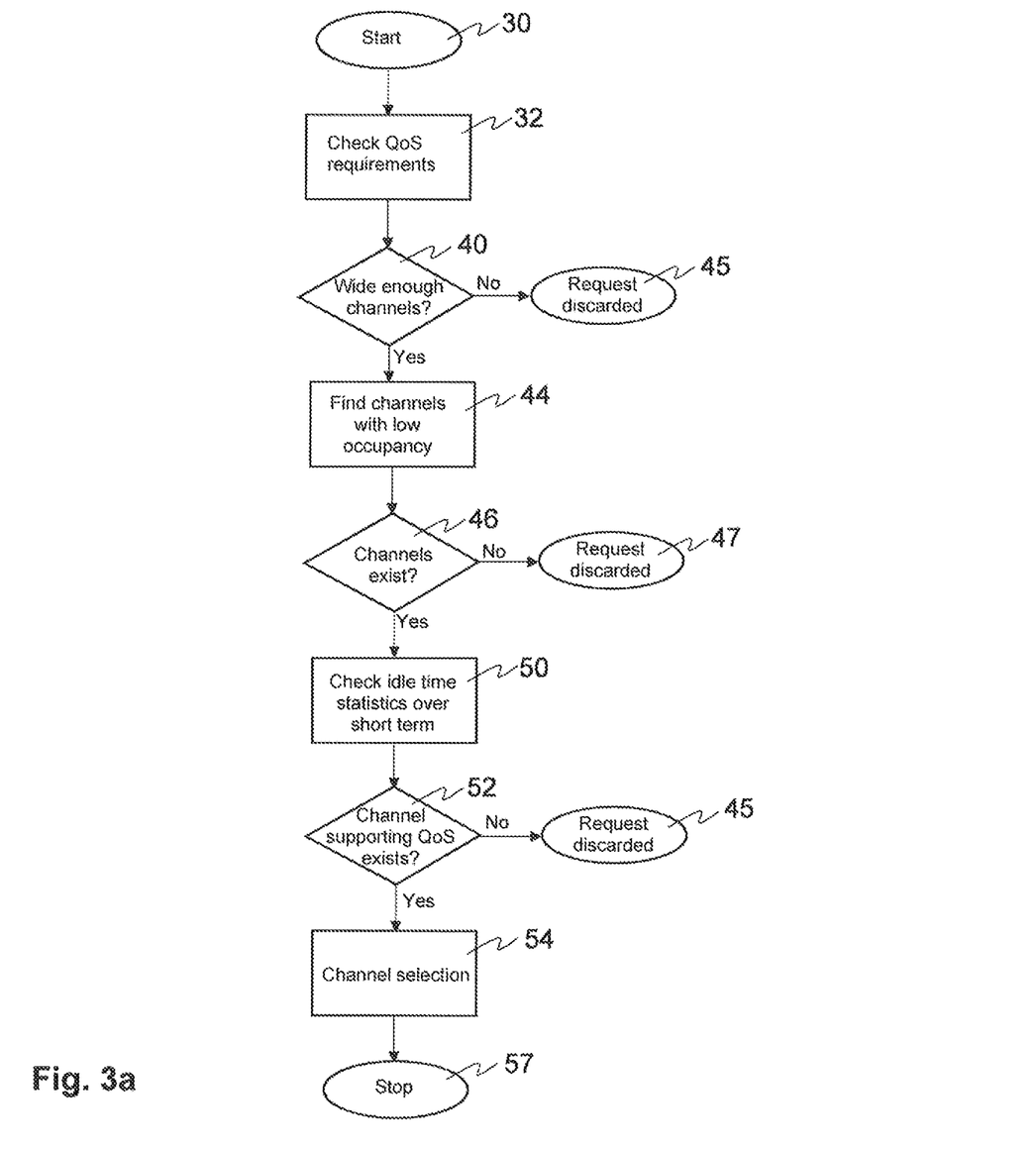
FIG. 3a shows an exemplary flow chart including main stages of the first embodiment of the spectrum selection and allocating according to the invention.

FIG. 3a depicts as an exemplary flow chart a channel selection and allocation process according to the invention that may be utilized in the spectrum management system 1 of FIG. 2 in context of delay-tolerant applications and services that can use short idle times when switching between available channels that may be in unlicensed bands.

The channel selection and allocation process starts in step 30 where an application or service that needs an uplink and/or downlink channel is started in a mobile device 3.

In step 32 a channel request 2 arrives from the mobile device 3 to the resource management server 5. In step 32 the resource management server 5 determines the embedded QoS requirements of the channel request, for example bandwidth. Channel requests may be prioritized for example according to time domain requirements such as idle time length when several channel access requests arrive at the same time from different mobile devices.

The search for channels that are not licensed for the system/operator starts in a logical comparison step 40. In step 40 the resource management server 5 checks from the database 7 availability of channels supporting the bandwidth requirements of the requested application or service. The database 7 includes long and short term spectrum information that has advantageously been received from spectrum sensing apparatuses, control channels of the wireless systems and also from other databases.

If there are no proper available channels that have a wide enough bandwidth (alternative "NO" in step 40), the service request is discarded in step 45.

If bandwidth requirements of the required service can be fulfilled (alternative "YES" in step 40), the occupancy status of these frequency bands is checked in step 44.

Advantageously only channels with a low enough occupancy status may be selected for further decision process in a logical comparison step 46. If all the channels are heavily occupied (alternative "NO" in step 46), the service request is discarded in step 47 since there is no room for a new service in these frequency bands.

If the low occupancy requirements can be fulfilled in at least one frequency band, the resource management server 5 checks idle time statistics at least over a short term in step 50. Advantageously the idle time statistics of promising channels may be checked over both a long term and short term to find out the most suitable channels for the requested service. The long term and short term values may be checked from the database 7 by using different time windows in the query. A channel should offer long enough idle times for the requested service to enable fluent operation in that frequency band.

If at least one suitable channel supporting all the QoS requirements of the requesting service is found, then in logical comparison step 52 (alternative "YES" in step 52) at least one channel is allocated to the requested service in step 54.

In step 57 the mobile device 3 utilizes the channel allocated to it.

If it is determined in step 52 that there are not channels fulfilling all QoS requirements of the requested service, the channel request is discarded in step 45.

Figure 3B:
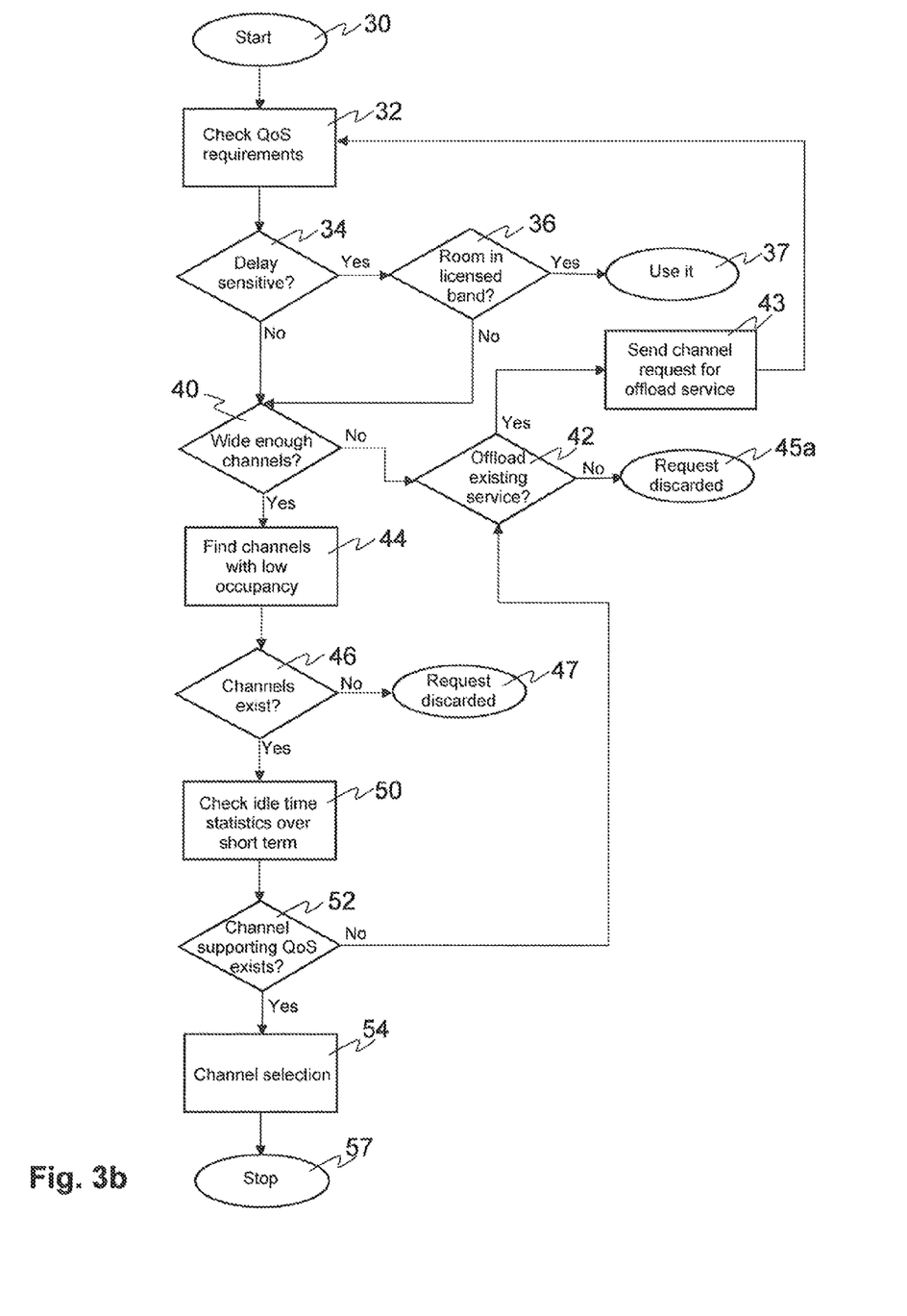
FIG. 3b shows an exemplary flow chart including main stages of the second embodiment of the spectrum selection and allocating according to the invention.

FIG. 3b depicts as an exemplary flow chart a channel selection and allocation process according to the invention that may be utilized in the spectrum management system 1 of FIG. 2 in context of delay-sensitive applications and services that need longer idle times than delay-tolerant applications.

The channel selection and allocation process starts in step 30 where a delay-sensitive application or service that needs an uplink and/or downlink channel is started in a mobile device 3.

In step 32 a channel request 2 arrives from the mobile device 3 to the resource management server 5. In step 32 the resource management server 5 determines the embedded QoS requirements of the channel request such as bandwidth and delay for example. Channel requests may be prioritized for example according to time domain requirements such as delay or idle time length when several channel access requests arrive at the same time from different mobile devices.

In a logical comparison step 34 the delay sensitivity of the requested channel request is checked in the resource management server 5. If the request is delay-sensitive (alternative "YES" in step 34), the resource management server 5 checks in a comparison step 36 whether there is room in the licensed band of the service to support the requested service. If there is room for the requested service (alternative "YES" in step 36), a licensed band is allocated to the mobile device 3, step 37.

If the requested service is not delay sensitive (alternative "NO" in step 34) or there is no room in the licensed band (alternative "NO" in step 36), then in the spectrum management system 1 it is started a search for channels that are not licensed for the system/operator.

The search for channels that are not licensed for the system/operator starts in a logical comparison step 40. In step 40 the resource management server 5 checks from the database 7 availability of channels supporting the bandwidth requirements of the requested application or service. The database 7 includes long and short term spectrum information that has advantageously been received from spectrum sensing apparatuses, control channels of the wireless systems and also from other databases.

If there are no proper available channels having a wide enough bandwidth (alternative "NO" in step 40), there is still a possibility to offload some existing service to make room for the requested service. If the resource management server 5 can find a new slot for the existing service in a different frequency band to enable operation of the requested service (alternative "Yes" in step 42), then a request for offloading the existing services is sent in step 43. If the existing services cannot be offloaded (alternative "NO" in step 42), the service request is discarded in step 45a.

If bandwidth requirements of the required service can be fulfilled (alternative "YES" in step 40), the occupancy status of these frequency bands is checked in step 44. Advantageously only channels with a low enough occupancy status may be selected for further decision process in a logical comparison step 46. If all the channels are heavily occupied (alternative "NO" in step 46), the service request is discarded in step 47 since there is no room for a new service in these frequency bands.

If the low occupancy requirements can be fulfilled in at least one frequency band, then the resource management server 5 checks idle time statistics at least over a short term in step 50. Advantageously the idle time statistics of promising channels may be checked over both a long term and short term to find out the most suitable channels for the requested service. The long term and short term values may be checked from the database 7 by using different time windows in the query. A channel should offer long enough idle times for the requested service to enable fluent operation in that frequency band.

If at least one suitable channel supporting all the QoS requirements of the requesting service is found, then in logical comparison step 52 (alternative "YES" in step 52) at least one channel is allocated to the requested service in step 54.

The requested services may belong to different priority classes. In this case also the priority classes of the requested services may be used in the channel selection process. The best channels offering the longest idle times are allocated to high priority services when they cannot be included in the licensed band operation.

In step 57 the mobile device 3 utilizes the channel allocated to it.

If it is determined in step 52 that there are not channels fulfilling all QoS requirements of the requested service, the channel selection process returns to step 42 where utilization of an offload service is checked.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for allocating a transmission channel for a wireless data processing device by a resource managing server, the method comprising:

receiving a service request from a wireless data processing device;
checking quality of service (QoS) requirements of the received service request;
checking bandwidth of the received service request;
determining if at least one transmission channel of the available unlicensed bands has enough bandwidth for the requested service;
checking occupancy status of the transmission channels having the required bandwidth; and
determining if at least one transmission channel with the required bandwidth and the allowable occupancy status is found, wherein the method further comprises:
checking idle time statistics of all transmission channels having the required bandwidth and the allowable occupancy status;
determining if at least one transmission channel with the required bandwidth, the allowable occupancy status and the allowable idle time status is found, and;
allocating the found transmission channel to the requested service.

2. The method according to claim 1, wherein the occupancy status and the idle time statistics are accomplished by:
sensing by a measurement apparatus periodically by a narrow frequency bin a predetermined frequency band over a predetermined time interval for evaluating time-dependent occupation status of each frequency bin of the predetermined frequency band;
saving the sensed occupation status of the frequency bins in a database;
retrieving by the resource management server the saved occupancy status results of the frequency bins from the database and aggregating occupancy status results of individual frequency bins at least to one bandwidth;
calculating by the resource management server idle time statistics of the predetermined time interval for each aggregated bandwidth;
calculating by the resource management server from the idle time statistics a spectrum occupation percentage for each aggregated bandwidth over a time period of interest, and;
saving the calculated results of each aggregated bandwidth in the database wherein also the available control channel information of particular wireless systems has been saved whereby the database comprises local, long term radio spectrum statistics that are accessible in real time for a dynamic radio spectrum management.

3. The method according to claim 1, wherein the method further comprises:
checking also delay requirements of the received service request and, if the request is delay sensitive;
determining if there is room in licensed bands;
and if such band is found, then using the found band;
and if such band is not found, then determining if at least one transmission channel of the available unlicensed bands has enough bandwidth for the requested delay-sensitive service; and
if a result of the determination of the required bandwidth is that any of the unlicensed bands does not have a wide enough bandwidth for the requested delay-sensitive service, then an existing service is offloaded to make room for the requested delay-sensitive service.

4. The method according to claim 2, wherein a minimum aggregated bandwidth is one frequency bin and a maximum aggregated bandwidth comprises all sensed frequency bins.

5. The method according to claim 4, wherein a mean idle time and busy times are calculated for each aggregated bandwidth.

6. The method according to claim 2, wherein a time between two consecutive sensing periods is selected to indicate short term variations in spectrum use of all local wireless systems.

7. The method according to claim 6, wherein the sensing period is 1 second and the predetermined measurement time interval is 24 hours.

8. The method according to claim 2, wherein the measurement apparatus is sensing both licenced frequency bands and unlicensed frequency bands.

9. A transmission channel allocating system comprising:
mobile devices capable of utilizing several licensed or unlicensed frequency bands;
a database comprising a local, long term radio spectrum statistic; and
a resource management server comprising
an input for receiving and an output for transmitting messages from and to wireless devices and the database;
a processor unit for:
checking quality of service (QoS) requirements of a received service request of a mobile device,
determining bandwidths of all available transmission channels and if at least one transmission channel with a required bandwidth is found;
checking occupancy status of the available transmission channels which have the required bandwidth; and
determining if at least one transmission channel with the required bandwidth and the allowable occupancy status is found,
wherein, for allocating a transmission channel to a requested service when there is no room in the licenced bands, the processor unit is further configured to:
check idle time statistics of all transmission channels having the required bandwidth and the allowable occupancy statistics;
determine if at least one transmission channel with the required bandwidth, the allowable occupancy statistics and the allowable idle time status is found; and
allocate the found transmission channel to the requested delay-sensitive service.

10. The transmission channel allocating system according to claim 9, wherein for accomplishing the occupancy status statistics and the idle time statistics the resource management server is further configured to:
sense periodically by a narrow frequency bin a predetermined frequency band over a predetermined time interval for evaluating time-dependent occupation status of each frequency bin of the predetermined frequency band;
save the sensed occupation status of the frequency bins in a database;
retrieve the saved occupancy status results of the frequency bins from the database and means for aggregating occupancy status results of individual frequency bins at least to one bandwidth;
calculate idle time statistics of the predetermined time interval for each aggregated bandwidth;
calculate from the idle time statistics a spectrum occupation percentage for each aggregated bandwidth over a time period of interest; and
save the calculated results of each aggregated bandwidth to the database wherein also available control channel information of particular wireless systems has been saved whereby the database comprises local, long term radio spectrum statistics that are accessible in real time for a dynamic radio spectrum management.

11. The transmission channel allocating system according to claim 9, wherein the resource management server is further configured to:
determine if the service request is delay sensitive, and if the request is delay sensitive;
determine if there is room in licensed bands; and
use the found band if at least one band is found;
determine if at least one transmission channel of the available unlicensed bands has enough bandwidth for the requested delay-sensitive service if room in the licensed bands is not found; and
offload an existing service to make room for the requested delay-sensitive service if a wide enough channel is not found from the unlicensed bands.

12. A computer program having computer readable codes for allocating transmission channels in a dynamic spectrum management stored on a non-transitory computer readable storage medium executed by a processor comprising:
computer readable code for receiving a service request from a wireless data processing device;
computer readable code for checking quality of service (QoS) requirements of the received service request;
computer readable code for checking bandwidth requirements of the received service request;
computer readable code for determining if at least one transmission channel of the available unlicensed bands has enough bandwidth for a requested delay sensitive service;
computer readable code for checking occupancy status of the transmission channels having the required bandwidth; and
computer readable code for determining if at least one transmission channel with the required bandwidth and the allowable occupancy status is found,
wherein it further comprises:
computer readable code for checking idle time statistics of all transmission channels having the required bandwidth and the allowable occupancy status;
computer readable code for determining if at least one transmission channel with the required bandwidth, the allowable occupancy status and the allowable idle time status is found; and
computer readable code for allocating the found transmission channel to the requested service.

13. The computer program according to claim 12, wherein it further comprises:
computer readable code for determining if the service request is delay sensitive, and if the request is delay sensitive;
computer readable code for determining if there is room in licensed bands; and
computer readable code for using a found band if at least one band is found;
computer readable code for determining if at least one transmission channel of the available unlicensed bands has enough bandwidth for the requested delay-sensitive service if room in the licensed bands is not found; and
computer readable code for offloading an existing service to make room for the requested delay sensitive service if a wide enough channel is not found from the unlicensed bands.

* * * * *

UNITED STATES PATENT AND TRADEMARK OFFICE
CERTIFICATE OF CORRECTION

PATENT NO. : 9,820,288 B2  
APPLICATION NO. : 14/892225  
DATED : November 14, 2017  
INVENTOR(S) : Marko Höyhtyä, Janne Kusmin and Heli Vuojala It is certified that error appears in the above-identified patent and that said Letters Patent is hereby corrected as shown below:

On the Title Page

Item (72) the second named inventor's name is: Janne Kusmin

Signed and Sealed this  
Eighth Day of May, 2018

Andrei Iancu  
*Director of the United States Patent and Trademark Office*